US008569527B2

(12) United States Patent
Matusz (10) Patent No.: US 8,569,527 B2
(45) Date of Patent: Oct. 29, 2013

(54) REACTOR SYSTEM, AN ABSORBENT AND A PROCESS FOR REACTING A FEED

(75) Inventor: Marek Matusz, Houston, TX (US)

(73) Assignee: Shell Oil Company, Houston, TX (US)

( * ) Notice: Subject to any disclaimer, the term of this patent is extended or adjusted under 35 U.S.C. 154(b) by 549 days.

(21) Appl. No.: 12/865,010

(22) PCT Filed: May 15, 2008

(86) PCT No.: PCT/US2008/063722
§ 371 (c)(1),
(2), (4) Date: Nov. 8, 2010

(87) PCT Pub. No.: WO2008/144402
PCT Pub. Date: Nov. 27, 2008

(65) Prior Publication Data
US 2011/0288339 A1   Nov. 24, 2011

Related U.S. Application Data

(60) Provisional application No. 60/938,890, filed on May 18, 2007.

(51) Int. Cl.
*C07D 301/10* (2006.01)
*C07D 301/03* (2006.01)
*C07C 69/96* (2006.01)
*C07C 215/00* (2006.01)
*C07C 31/18* (2006.01)
*C07C 27/10* (2006.01)

(52) U.S. Cl.
USPC ........... 549/534; 549/537; 558/277; 568/852; 568/955; 564/277

(58) Field of Classification Search
USPC ................... 549/534, 537; 564/503; 558/277; 568/852, 955
See application file for complete search history.

(56) References Cited

U.S. PATENT DOCUMENTS

| 113,534 A | 4/1871 | La Port |
| 1,153,564 A | 9/1915 | Nichol |
| 1,422,184 A | 7/1922 | Curme |
| 1,529,537 A | 3/1925 | Barman |
| 1,741,559 A | 12/1929 | Dawson |

(Continued)

FOREIGN PATENT DOCUMENTS

| CH | 1271351 | 10/2000 |
| DE | 3029188 | 4/1986 |

(Continued)

OTHER PUBLICATIONS

Kirk-Othmer Encyclopedia of Chemical Technology, 3rd Edition, vol. 9, 1980, pp. 445-447.

(Continued)

*Primary Examiner* — Taylor Victor Oh (57) ABSTRACT

The present invention provides a reactor system comprising: —one or more purification zones comprising an absorbent which comprises silver, an alkali or alkaline earth metal, and a support material having a surface area of more than 20 m2/g, and —a reaction zone comprising a catalyst, which reaction zone is positioned downstream from the one or more purification zones; an absorbent; a process for reacting a feed comprising one or more feed components; and a process for preparing a 1,2-diol, a 1,2-diol ether, a 1,2-carbonate, or an alkanolamine.

20 Claims, 2 Drawing Sheets

(56) References Cited

U.S. PATENT DOCUMENTS

| | | |
|---|---|---|
| 1,851,312 A | 3/1932 | Huff |
| 2,143,371 A | 1/1939 | Francon .................. 260/348 |
| 2,378,969 A | 6/1945 | Bailey et al. ............... 260/677 |
| 2,408,010 A | 9/1946 | Wadley et al. .............. 260/677 |
| 2,432,123 A | 12/1947 | Hunter ........................ 260/677 |
| 2,491,057 A | 12/1949 | Nevlson et al. ........... 260/348.5 |
| 2,497,296 A | 2/1950 | Chance et al. ................ 260/677 |
| 2,542,520 A | 2/1951 | Hibshman ................... 183/115 |
| 2,573,341 A | 10/1951 | Kneil ............................ 260/677 |
| 2,588,323 A | 3/1952 | Kneil ............................ 260/677 |
| 2,805,733 A | 9/1957 | Stanton ........................ 183/115 |
| 2,813,920 A | 11/1957 | Cobb, Jr. ........................ 260/683 |
| 2,836,635 A | 5/1958 | Gothel et al. .................. 260/677 |
| 2,837,587 A | 6/1958 | Hogan et al. ............ 260/683.15 |
| 3,000,988 A | 10/1959 | Karchmer et al. ............. 260/677 |
| 2,942,042 A | 6/1960 | Folz ............................... 260/677 |
| 2,953,608 A | 9/1960 | Fernald ......................... 260/677 |
| 2,973,628 A | 3/1961 | Green et al. ...................... 62/24 |
| 3,000,942 A | 9/1961 | Frankel .......................... 260/561 |
| 3,055,183 A | 9/1962 | Kneil ................................. 62/17 |
| 3,106,462 A | 10/1963 | Cottle ................................ 55/20 |
| 3,169,052 A | 2/1965 | Davison ............................ 62/20 |
| 3,324,194 A | 6/1967 | Kanbayashi et al. ......... 260/677 |
| 3,326,999 A | 6/1967 | Rhodes, Jr. ................... 260/677 |
| 3,432,573 A | 3/1969 | Keil et al. ................ 260/683.15 |
| 3,456,029 A | 7/1969 | Morita et al. ................. 260/677 |
| 3,530,199 A | 9/1970 | Lowrance ..................... 260/683 |
| 3,549,719 A | 12/1970 | Duyverman et al. ......... 260/677 |
| 3,676,516 A | 7/1972 | Haskell et al. ................ 260/677 |
| 3,844,981 A | 10/1974 | Cusumano .................... 252/471 |
| 4,059,418 A | 11/1977 | Cull ................................... 55/73 |
| 4,085,192 A | 4/1978 | Van Scoy ....................... 423/226 |
| 4,105,588 A | 8/1978 | Balducci et al. ............... 252/454 |
| 4,182,722 A | 1/1980 | Lyons ....................... 260/348.33 |
| 4,729,889 A | 3/1988 | Flytani-Stephanopoulos et al. ............................. 423/593 |
| 4,766,105 A | 8/1988 | Lauritzen ...................... 502/216 |
| 4,822,900 A | 4/1989 | Hayden ......................... 549/534 |
| 4,845,296 A | 7/1989 | Ahmed et al. ................. 564/477 |
| 4,921,681 A | 5/1990 | Ozero et al. ................... 422/197 |
| 5,145,824 A | 9/1992 | Buffum et al. ................ 502/216 |
| 5,322,615 A | 6/1994 | Holtermann et al. ............ 208/91 |
| 5,380,697 A | 1/1995 | Matusz et al. ................. 502/348 |
| 5,466,837 A | 11/1995 | Ramachandran et al. .... 549/533 |
| 5,739,075 A | 4/1998 | Matusz ......................... 502/302 |
| 5,801,115 A | 9/1998 | Albers et al. .................. 549/536 |
| 5,801,259 A | 9/1998 | Kowaleski ..................... 549/536 |
| 5,990,372 A | 11/1999 | Blankenship et al. ......... 585/823 |
| 6,040,467 A | 3/2000 | Papavassiliou et al. ....... 549/534 |
| 6,042,798 A | 3/2000 | Masuda et al. ........... 423/244.01 |
| 6,080,897 A | 6/2000 | Kawabe ........................ 568/858 |
| 6,124,517 A | 9/2000 | Kaminsky et al. ............. 585/829 |
| 6,368,998 B1 | 4/2002 | Lockemeyer .................. 502/347 |
| 6,624,318 B1 | 9/2003 | Muller et al. .................. 549/529 |
| 6,717,001 B2 | 4/2004 | Evans et al. ................... 549/536 |
| 6,762,310 B2 | 7/2004 | Neumann et al. ............. 549/523 |
| 6,939,979 B2 | 9/2005 | Rizkalla et al. ............... 549/533 |
| 7,132,555 B2 | 11/2006 | Raa et al. ....................... 549/533 |
| 2002/0099248 A1 | 7/2002 | Ziaka-Vasileiadou et al. ............................. 585/330 |
| 2003/0017943 A1 | 1/2003 | Shan et al. ..................... 502/243 |
| 2003/0028040 A1 | 2/2003 | Seeba et al. ................... 549/532 |
| 2003/0105376 A1 | 6/2003 | Foral et al. .................... 585/804 |
| 2004/0124140 A1* | 7/2004 | Sawyer et al. ................. 210/634 |
| 2004/0176653 A1 | 9/2004 | Vorberg et al. ................ 585/249 |
| 2004/0236124 A1* | 11/2004 | Evans et al. ................... 549/534 |
| 2005/0192448 A1* | 9/2005 | Rubinstein et al. ........... 549/534 |
| 2006/0036104 A1 | 2/2006 | Lu et al. ........................ 549/512 |
| 2006/0258529 A1 | 11/2006 | Diefenbacher et al. ....... 502/321 |
| 2006/0292046 A1 | 12/2006 | Fruchey et al. ............... 422/197 |
| 2007/0031302 A1 | 2/2007 | Wittrup et al. ................ 422/168 |

FOREIGN PATENT DOCUMENTS

| | | |
|---|---|---|
| EP | 1121977 | 8/2001 |
| WO | WO9736680 | 10/1997 |
| WO | WO0253491 | 10/2000 |
| WO | WO0294435 | 11/2002 |
| WO | WO2004039496 | 5/2004 |
| WO | WO2004092148 | 10/2004 |

OTHER PUBLICATIONS

Brunauer, et al., Journal of the American Chemical Society 60 (1938) pp. 309-316.

Rebsdate, S, et al: Ethylene Oxide 2005, Ullmann's Encyclopedia of Industrial Chemistry, Weinheim, VCH Verlag: DE, pp. 1-27, XP00205553, 2005.

Otsuka, et al: Electrochemical Cells as Reactors for Selective Oxygenation of Hydrocarbons at Low Temperature, Catalysis Today (1998)41(4), pp. 311-325.

Komiya, et al: Aerobic Oxideation of Alkanes and Alkenes in the presence of aldehydes catalyzed by copper salts and copper-crown ethers, Journal of Molecular Catalysis A: Chemical (1997), p. 117 (1-3, Proceedings of the 6$^{th}$ Intl Symposium on the Activstion of Dioxygen and Homogeneous Catalytic Oxidation, 1996), pp. 21-37.

Rouchard, et al: Catalysis by chelates of transition elements of the liquid phase oxidation of propylene, Journal of Catalysis (1970), 19(2), 172-5.

\* cited by examiner

REACTOR SYSTEM, AN ABSORBENT AND A PROCESS FOR REACTING A FEED

The present application claims priority to U.S. Provisional Patent Application 60/938,890 filed 18 May 2007.

FIELD OF THE INVENTION

The invention relates to a reactor system, an absorbent and a process for reacting a feed which process utilizes the inventive reactor system.

BACKGROUND OF THE INVENTION

In industrial-scale chemical operations, components are used in the feedstream which typically contain low levels of impurities even after being subjected to a purification process. The low levels of impurities still remaining in the feedstream can act as catalyst poisons in the reaction process, adversely affecting the performance of the catalyst. Of particular concern are trace sulfur, halogen, phosphorous, arsenic and selenium impurities that may be present in the feedstream. Metal or noble metal catalysts are generally susceptible to catalyst poisoning by these elements, for example many metals are known to form sulfides even if sulfur is present in the feedstream in quantities below the parts per million level. Processes which use a metal or noble metal catalyst include, but are not limited to, ammoxidation reactions, dehydrogenation reactions, catalytic reforming reactions, and oxidation reactions, in particular partial oxidation of an olefin to form an olefin oxide such as ethylene oxide. These reactions are typically highly exothermic and generally performed in a vertical shell-and-tube heat exchanger comprising a multitude of reaction tubes, each containing a packed bed of solid particulate catalyst and surrounded by a heat exchange fluid. In the production of olefin oxides, such as ethylene oxide, silver-based catalysts are used to convert ethylene and oxygen into ethylene oxide. These silver-based catalysts are especially susceptible to catalyst poisoning even at impurity amounts on the order of parts per billion levels. The catalyst poisoning impacts the catalyst performance, in particular the selectivity or activity, and shortens the length of time the catalyst can remain in the reactor before having to exchange the poisoned catalyst with fresh catalyst.

Typical sulfur-containing impurities present in the feedstream can include, but are not limited to, dihydrogen sulfide, carbonyl sulfide, mercaptans, and organic sulfides. Typical halogen-containing impurities present in the feedstream can include, but are not limited to, freons or halohydrocarbons. In an epoxidation process, additional impurities may include, phosphorous, arsenic, selenium, acetylene, carbon monoxide. The sulfur, phosphorous, arsenic, and selenium impurities present in the feedstream may originate from a hydrocarbon such as an olefin or a saturated hydrocarbon such as methane or ethane. The halogen impurities present in the feedstream may originate from an oxygen source such as air or high purity oxygen.

Over the years, much effort has been devoted to improving the olefin epoxidation process. Solutions have been found in various improved reactor designs.

For example, U.S. Pat. No. 6,939,979 describes the use of an alkali metal treated inert as a diluent for the catalyst positioned in an upper section of the reactor tubes. Treating the inert with an alkali metal reduces the degradation of ethylene oxide by the inert thereby improving the selectivity to ethylene oxide. However, placing an inert material upstream from the catalyst does not significantly reduce the amount of impurities present in the feed which can poison the catalyst.

Thus, not withstanding the improvements already achieved, there exists a desire for a reactor system and reaction process that further improves the performance of the catalyst, in particular the duration of time the catalyst remains in the reactor before exchanging with a fresh catalyst.

SUMMARY OF THE INVENTION

The present invention provides a reactor system comprising:

one or more purification zones comprising an absorbent which comprises silver, an alkali or alkaline earth metal, and a support material having a surface area of more than 20 $m^2/g$, and a reaction zone comprising a catalyst, which reaction zone is positioned downstream from the one or more purification zones.

The invention also provides a process for reacting a feed comprising one or more feed components comprising a hydrocarbon, which process comprises:

contacting one or more of the feed components with an absorbent comprising silver, an alkali or alkaline earth metal, and a support material having a surface area of more than 20 $m^2/g$ to reduce the quantity of one or more impurities in the feed components; and subsequently contacting the feed components with a catalyst to yield a reaction product.

In an embodiment, the hydrocarbon in the feed comprises an olefin and the feed further comprises oxygen as a feed component yielding an olefin oxide containing reaction product.

The present invention also provides an absorbent for the removal of one or more impurities from one or more feed components which absorbent comprises silver, an alkali or alkaline earth metal, and a support material having a surface area of more than 20 $m^2/g$.

Further, the invention provides a process of preparing a 1,2-diol, a 1,2-diol ether, a 1,2-carbonate, or an alkanolamine comprising obtaining an olefin oxide by the process according to this invention, and converting the olefin oxide into the 1,2-diol, the 1,2-diol ether, the 1,2-carbonate, or the alkanolamine.

DETAILED DESCRIPTION OF THE INVENTION

It has been found that an absorbent comprising silver, an alkali or alkaline earth metal, and a support material having a surface area of more than 20 $m^2/g$ can significantly reduce the amount of impurities, in particular sulfur- or halogen-containing impurities, in feed components. By reducing the amount of impurities which can act as catalyst poisons, the catalyst performance is improved, in particular the selectivity or activity of the catalyst as well as the duration of time the catalyst can remain in the reactor system. It is surprising that the absorbent has improved capabilities to reduce the impurities in the feed compared to a typical silver-based epoxidation catalyst prepared with carriers having a typical surface area of at most 10 m$^2$/g.

The terms "substantially vertical" and "substantially horizontal", as used herein, are understood to include minor deviations from true vertical or horizontal positions relative to the central longitudinal axis of the reactor vessel, in particular the terms are meant to include variations ranging from 0 to 20 degrees from true vertical or horizontal positions. True vertical is aligned along the central longitudinal axis of the reactor vessel. True horizontal is aligned perpendicular to the central longitudinal axis of the reactor vessel.

The term "substantially parallel", as used herein, is understood to include minor deviations from a true parallel position relative to the central longitudinal axis of the reactor vessel, in particular the term is meant to include variations ranging from 0 to 20 degrees from a true parallel position relative to the central longitudinal axis of the reactor vessel.

Figure 1:
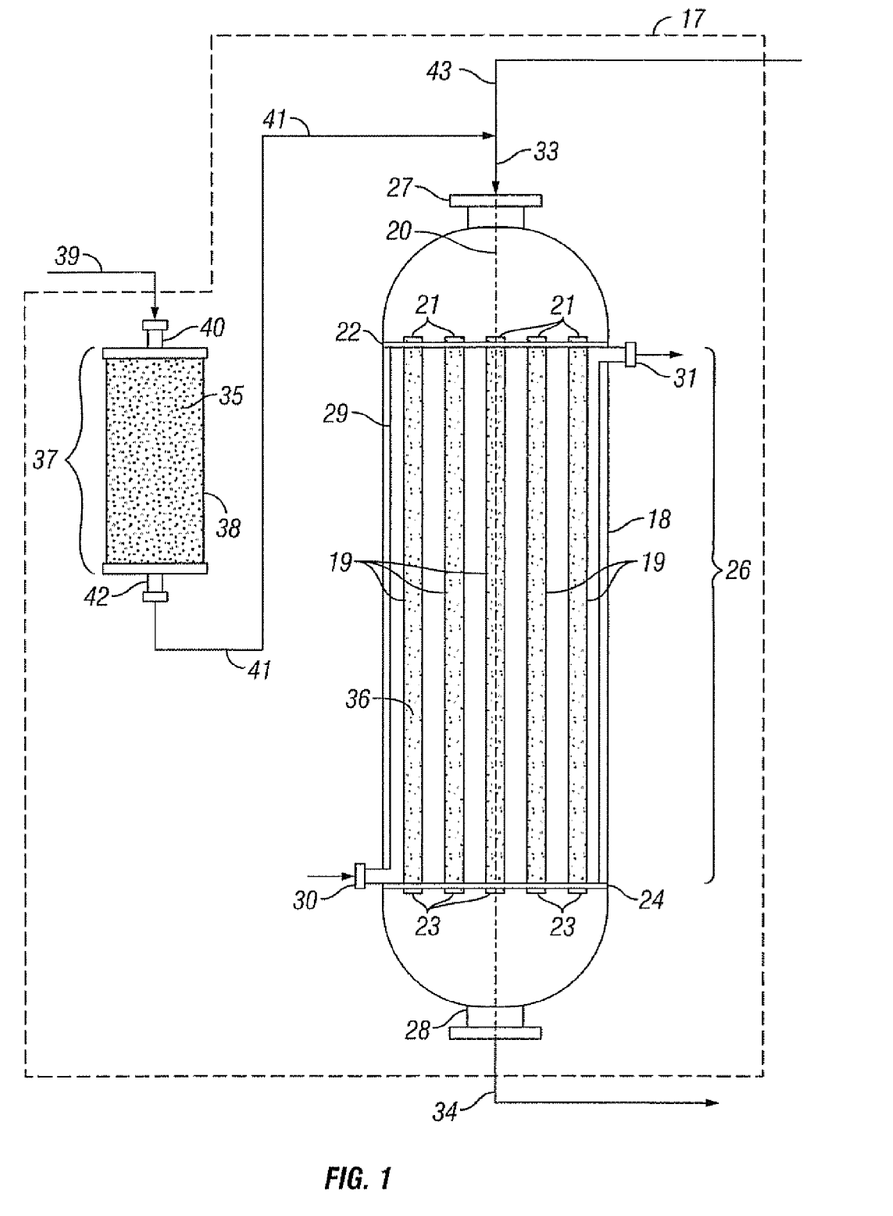
FIG. 1 is a schematic view of a reactor system according to an embodiment of the invention which has a purification zone comprising the absorbent positioned outside of the reactor vessel.

Reference is made to FIG. 1, which is a schematic view of a reactor system (17) comprising a shell-and-tube heat exchanger reactor vessel having a substantially vertical vessel (18) and a plurality of open-ended reactor tubes (19) positioned substantially parallel to the central longitudinal axis (20) of the reactor vessel (18). The upper ends (21) of the reactor tubes (19) are connected to a substantially horizontal upper tube plate (22) and the lower ends (23) of the reactor tubes (19) are connected to a substantially horizontal lower tube plate (24). The upper tube plate (22) and the lower tube plate (24) are supported by the inner wall of the reactor vessel (18). The plurality of reactor tubes (19) contain a reaction zone (26) containing a catalyst (36). The catalyst (36) is supported in the reactor tubes (19) by a catalyst support means (not shown) arranged in the lower ends (23) of the reactor tubes (19).

Components of the feed, such as the hydrocarbon, enter the reactor vessel (18) via one or more inlets such as inlet (27) which are in fluid communication with the upper ends (21) of the reactor tubes (19). The reaction product (34) exits the reactor vessel (18) via one or more outlets such as outlet (28) which are in fluid communication with the lower ends (23) of the reactor tubes (19). The heat exchange fluid enters the heat exchange chamber (29) via one or more inlets such as inlet (30) and exits via one or more outlets such as outlet (31). The heat exchange chamber (29) may be provided with baffles (not shown) to guide the heat exchange fluid through the heat exchange chamber (29).

The reactor system (17) comprises a purification zone (37) contained inside a separate purification vessel (38) positioned upstream from and outside of the reactor vessel (18). The purification zone (37) contains an absorbent (35). One or more feed components to be treated (39) enter the separate purification vessel (38) through inlet (40), and the treated feed components (41) exit the separate purification vessel (38) through outlet (42). The treated feed components subsequently enter the reactor vessel (18) along with any additional feed components (43) as feed (33) through inlet (27).

Figure 2:
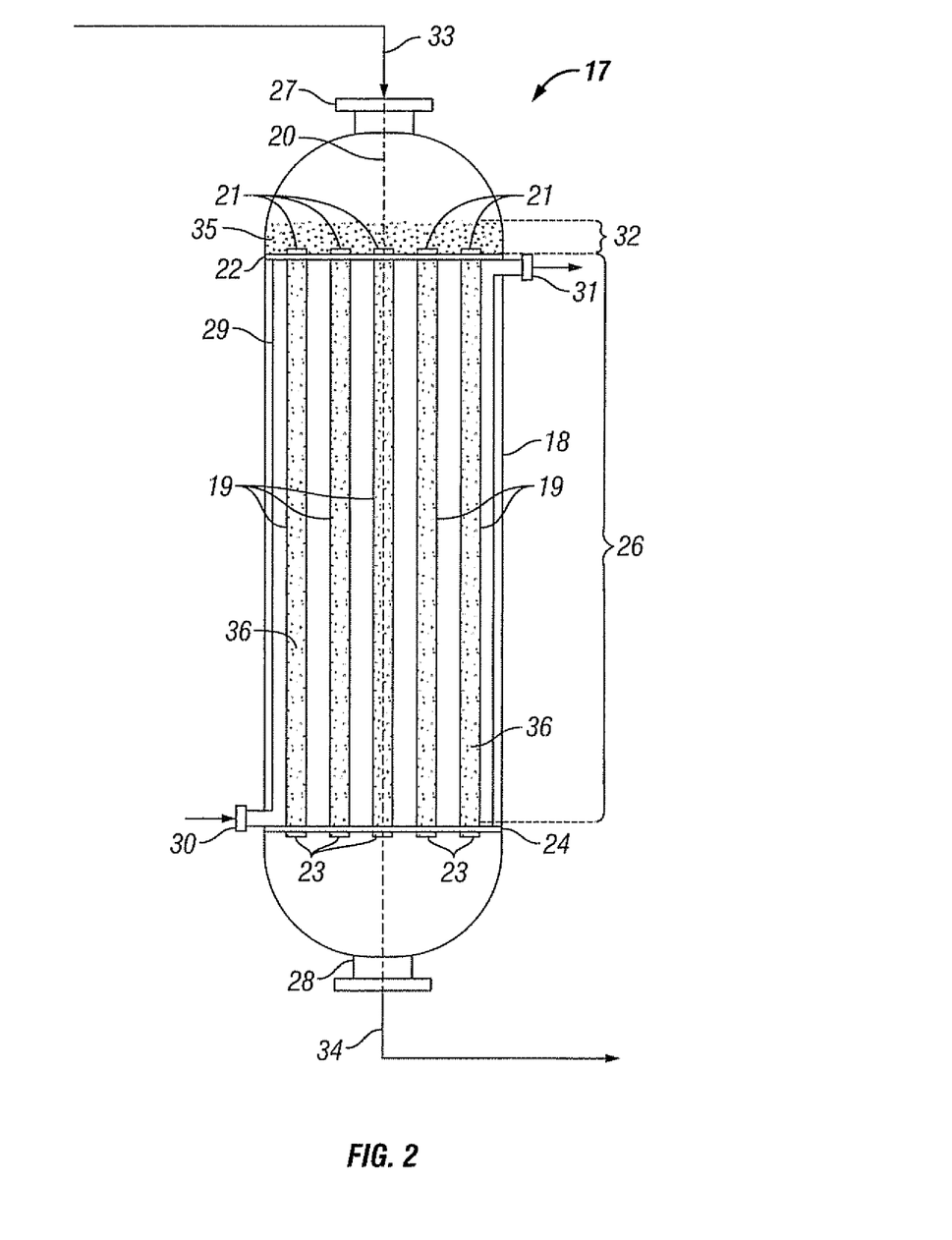
FIG. 2 is a schematic view of a reactor system according to an embodiment of the invention which has a purification zone positioned inside the reactor vessel and upstream from the reactor tubes.

FIG. 2 is a schematic view of a reactor system (17) comprising a shell-and-tube heat exchanger reactor vessel (18) similar to FIG. 1 except that the purification zone (32) containing an absorbent (35) is positioned inside of the reactor vessel (18) and upstream from the reactor tubes (19).

The reactor vessel of the present invention may be any reactor vessel used to react a feed containing one or more feed components. The reactor vessel may contain one or more open-ended reactor tubes. Preferably, the reactor vessel may contain a plurality of reactor tubes. The reactor tubes may be any size. Suitably, a reactor tube may have an internal diameter of at least 5 mm (millimeters), in particular at least 10 mm. Suitably, a reactor tube may have an internal diameter of at most 5 m (meters), in particular at most 1 m. Suitably, a reactor tube may have a length of at least 1 m, in particular at least 5 m. Suitably, a reactor tube may have a length of at most 50 m, in particular at most 30 m.

Preferably, the reactor vessel is a shell-and-tube heat exchanger containing a plurality of reactor tubes. The reactor tubes may preferably have an internal diameter in the range of from 15 to 80 mm, more preferably from 20 to 75 mm, and most preferably from 25 to 70 mm. The reactor tubes may preferably have a length in the range of from 5 to 20 m, more preferably from 10 to 15 m. The shell-and-tube heat exchanger may contain from 1000 to 20000 reactor tubes, in particular from 2500 to 15000 reactor tubes.

The one or more reactor tubes are positioned substantially parallel to the central longitudinal axis of the reactor vessel and are surrounded by a shell adapted to receive a heat exchange fluid (i.e., the shell side of the shell-and-tube heat exchanger). The heat exchange fluid in the heat exchange chamber may be any fluid suitable for heat transfer, for example water or an organic material suitable for heat exchange. The organic material may be an oil or kerosene. The upper ends of the one or more reactor tubes are connected to a substantially horizontal upper tube plate and are in fluid communication with the one or more inlets to the reactor vessel, and the lower ends of the one or more reactor tubes are connected to a substantially horizontal lower tube plate and are in fluid communication with the one or more outlets to the reactor vessel (i.e., the tube side of the shell-and-tube heat exchanger). The reactor vessel contains a reaction zone comprising a packed bed of catalyst particles. The catalyst bed is positioned inside the one or more reactor tubes.

The purification of the feed components occurs within one or more purification zones located outside of the reactor vessel or within a purification zone positioned inside of the reactor vessel.

In an embodiment, one or more purification zones are located outside of the reactor vessel (i.e., separate from the reactor vessel). The various feed components may be fed to separate purification zones. A purification zone may comprise one or more separate purification vessels each containing a packed bed of the absorbent. The one or more purification vessels are located upstream from the reactor vessel. The packed bed of the absorbent may have any bed height. A purification zone may comprise two or more separate purification vessels. The two or more purification vessels may be arranged in parallel with associated switching means to allow the process to be switched between purification vessels, thus maintaining a continuous operation of the process. Suitable switching means that can be used in this embodiment are known to the skilled person.

In an embodiment, the reactor vessel may contain a purification zone comprising a packed bed of absorbent positioned upstream from the one or more reactor tubes, for example positioned on top of the upper tube plate and reactor tubes in the headspace of the reactor vessel. In this embodiment, the packed bed of absorbent may have a bed height of at least 0.05 m, in particular at least 0.075 m, more in particular at least 0.1 m, most in particular at least 0.15 m. In this embodiment, the absorbent may have a bed height of at most 2 m, in particular at most 1 m, more in particular at most 0.5 m.

The reactor vessel contains a reaction zone comprising a catalyst bed. In the normal practice of this invention, a major portion of the catalyst bed comprises catalyst particles. By a "major portion" it is meant that the ratio of the weight of the catalyst particles to the weight of all the particles contained in the catalyst bed is at least 0.50, in particular at least 0.8, preferably at least 0.85, more preferably at least 0.9. Particles which may be contained in the catalyst bed other than the catalyst particles are, for example, inert particles; however, it is preferred that such other particles are not present in the catalyst bed. The catalyst bed is supported in the one or more reactor tubes by a catalyst support means arranged in the lower ends of the reactor tubes. The support means may include a screen or a spring.

The catalyst bed may have any bed height. Suitably, the catalyst bed may have a bed height of 100% of the length of the reactor tube. The catalyst bed may suitably have a bed height of at most 95% or at most 90%, or at most 85%, or at most 80% of the length of the reactor tube. The catalyst bed may suitably have a bed height of least 10% of the length of the reactor tube, in particular at least 25%, more in particular at least 50% of the length of the reactor tube.

The one or more reactor tubes may also contain a separate bed of particles of an inert material for the purpose of, for example, heat exchange with a feedstream. The one or more reactor tubes may also contain another such separate bed of inert material for the purpose of, for example, heat exchange with the reaction product. Alternatively, rod-shaped metal inserts may be used in place of the bed of inert material. For further description of such inserts, reference is made to U.S. Pat. No. 7,132,555, which is incorporated by reference.

The present invention also provides a process for reacting a feed comprising one or more feed components which include a hydrocarbon by providing a reactor system in accordance with the invention; reducing the amount of impurities in one or more of said feed components by contacting said feed components with the absorbent to yield treated feed components; and subsequently reacting the feed comprising the one or more treated feed components by contacting the feed with the catalyst to yield a reaction product. The term "reaction product" as used herein is understood to refer to the fluid exiting from the outlet of the reactor vessel. Processes which react a feed in the presence of a metal-containing catalyst include, but are not limited to, ammoxidation, dehydrogenation, reformation, and oxidation, in particular partial oxidation such as the epoxidation of an olefin to form an olefin oxide. The skilled person will be able to select a suitable catalyst and reaction conditions for the process in question.

In the embodiment where the one or more purification zones are positioned outside of the reactor vessel, the temperature of the absorbent in the one or more purification zones may be in the range of from 0 to 350° C., in particular from 15 to 320° C., more in particular from 20 to 300° C. When operating at low temperatures, any acetylene impurities in the feed components should be removed prior to contact with the absorbent to minimize the formation of acetylides. In this embodiment, when there is a desire to reduce the amount of halogen-containing impurities in one or more feed components, it is particularly preferred that the temperature of the absorbent is in the range of from 190 to 350° C., in particular from 200 to 320° C., more in particular from 210 to 270° C. Preferably, the halogen impurities are removed from one or more feed components before entering the reaction vessel since the feed entering the reactor vessel may include one or more halogen-containing feed components such as an organic halide reaction modifier. When reducing the amount of halogen-containing impurities in the feed components, it is preferred to separately treat the feed components which act as reactants in the process, for example separately treating an oxygen feed component which is essentially hydrocarbon free and a hydrocarbon feed component which is essentially oxygen-free. By "essentially hydrocarbon-free" it is meant that the component contains at most 0.5 mole-% hydrocarbon, basis the component. By "essentially oxygen-free" it is meant that the component contains at most 0.5 mole-% oxygen, basis the component. The hydrocarbon or the oxygen components may further comprise additional feed components such as inert diluents. Treating a mixture of reactant feed components at high temperatures should be avoided since it can result in the combustion of the feed components.

In the embodiment where the purification zone is positioned inside of the reactor vessel, the temperature of the absorbent in the purification zone may be at least 90° C., in particular at least 130° C., more in particular at least 150° C., and at most 180° C., in particular at most 175° C., more in particular at most 170° C. In this embodiment, the temperature of the absorbent may be in the range of from 130 to 180° C., preferably from 150 to 175° C. Higher temperatures are avoided when the absorbent is positioned inside the reactor vessel since the absorbent can remove the desired halogen-containing feed components, for example the organic halide reaction modifier, and can cause the combustion of the reactant feed components, for example the combustion of the olefin in the presence of oxygen.

The reaction temperature in the reaction zone may be at least 130° C., in particular at least 150° C., more in particular at least 180° C., most in particular at least 200° C. The reaction temperature may be at most 350° C., in particular at most 325° C., more in particular at most 300° C. The reaction temperature may be in the range of from 150 to 350° C., preferably from 180 to 300° C.

The reaction feed to the reactor vessel contains one or more feed components. The feed components may include, but are not limited to, a hydrocarbon, oxygen, a reaction modifier, an inert diluent, and a recycle stream.

The hydrocarbon present in the reaction feed may function as a reactant or a diluent. The hydrocarbon may be an unsaturated hydrocarbon or a saturated hydrocarbon. The saturated hydrocarbon may be selected from methane, ethane, propane, butane, pentane, hexane, heptane, octane, nonane, decane, undecane, dodecane, and mixtures thereof. In particular, the saturated hydrocarbon may be selected from methane, ethane, propane, and mixtures thereof, preferably methane. Saturated hydrocarbons are common dilution gases, especially in an epoxidation process, and can be a significant source of impurities in the reaction feed, in particular sulfur impurities.

The unsaturated hydrocarbon may function as a reactant and may include any olefin, such as an aromatic olefin, for example styrene, or a di-olefin, whether conjugated or not, for example 1,9-decadiene or 1,3-butadiene. Preferably, the olefin may be a monoolefin, for example 2-butene or isobutene. More preferably, the olefin may be a mono-α-olefin, for example 1-butene or propylene. The most preferred olefin is ethylene. Suitably, mixtures of olefins may be used.

The olefin may be obtained from several sources including, but not limited to, petroleum processing streams such as those generated by a thermal cracker, a catalytic cracker, a hydrocracker or a reformer, natural gas fractions, naphtha, and organic oxygenates such as alcohols. The alcohols are typically derived from the fermentation of various biomaterials including, but not limited to, sugar cane, syrup, beet juice, molasses, and other starch-based materials. An olefin, such as ethylene, derived from an alcohol prepared via a fermentation process can be a particularly troublesome source of sulfur impurities.

The hydrocarbon may be present in the reaction feed in a quantity of at least 1 mole-%, relative to the total reaction feed, in particular at least 5 mole-%, more in particular at least 15 mole-%, most in particular at least 20 mole-%, on the same basis. The hydrocarbon material may be present in the reaction feed in a quantity of at most 95 mole-%, relative to the total reaction feed, in particular at most 90 mole-%, more in particular at most 80 mole-%, most in particular at most 75 mole-%, on the same basis.

The unsaturated hydrocarbon may be present in a quantity of at least 0.5 mole-%, relative to the total reaction feed, in particular at least 1 mole-%, more in particular at least 15 mole-%, most in particular at least 20 mole-%, on the same basis. The unsaturated hydrocarbon may be present in a quantity of at most 80 mole-%, relative to the total reaction feed, in particular at most 70 mole-%, more in particular at most 60 mole-%, on the same basis.

The saturated hydrocarbon may be present in a quantity of at least 1 mole-%, relative to the total reaction feed, in particular at least 10 mole-%, more in particular at least 20 mole-%, most in particular at least 30 mole-%, on the same basis. The saturated hydrocarbon may be present in a quantity of at most 80 mole-%, relative to the total reaction feed, in particular at most 75 mole-%, more in particular at most 70 mole-%, on the same basis.

The reaction feed may also contain oxygen as a reactant. The source of oxygen may include air and/or high purity oxygen. Oxygen may be present in a quantity of at least 0.5 mole-%, relative to the total reaction feed, in particular at least 1 mole-%, more in particular at least 2 mole-%, most in particular at least 5 mole-%, relative to the total reaction feed. Oxygen may be present in a quantity of at most 25 mole-%, relative to the total reaction feed, in particular at most 20 mole-%, more in particular at most 15 mole-%, most in particular at most 12 mole-%, relative to the total reaction feed.

The absorbent comprises silver, an alkali or alkaline earth metal, and a support material. Without wishing to be bound by theory, it is believed the absorbent reduces the impurities in the feed by chemical or physical means including, but not limited to, reaction with the impurities and absorption of the impurities. The absorbent may be prepared by co-mulling the components of the absorbent. For further description of such co-mulling methods, reference may be made to US 2006/0036104, which is hereby incorporated by reference. Preferably, the silver and alkali or alkaline earth metals are deposited on the support material through an impregnation method. For further description of such impregnation methods, reference may be made to U.S. Pat. No. 5,380,697, U.S. Pat. No. 5,739,075, EP-A-266015, and U.S. Pat. No. 6,368,998, which methods are incorporated herein by reference. Methods of depositing silver on a support material include impregnating the support with a silver compound containing cationic silver or complexed silver and performing a reduction to form metallic silver particles. Suitably, silver dispersions, for example silver sols, may be used to deposit silver on the support material.

The reduction of cationic silver to metallic silver may be accomplished during a step in which the absorbent is dried, so that the reduction as such does not require a separate process step. This may be the case if the silver containing impregnation solution comprises a reducing agent, for example, an oxalate, a lactate or formaldehyde.

The absorbent may contain silver in a quantity of at least 5 g/kg, in preferably at least 100 g/kg, more preferably at least 150 g/kg, most preferably at least 200 g/kg, relative to the weight of the absorbent. Preferably, the absorbent comprises silver in a quantity of from 5 to 500 g/kg, more preferably from 150 to 400 g/kg, for example 105 g/kg, or 120 g/kg, or 190 g/kg, or 250 g/kg, or 350 g/kg, on the same basis. As used herein, unless otherwise specified, the weight of the absorbent is deemed to be the total weight of the absorbent including the weight of the support material.

The support material may be selected from alumina, titania, zirconia, silica, activated carbon or mixtures thereof. Preferably, the support material may be alumina, in particular gamma-alumina. The support material has a surface area of more than 20 $m^2/g$, preferably at least 25 $m^2/g$, more preferably at least 50 $m^2/g$, most preferably at least 75 $m^2/g$, in particular at least 100 $m^2/g$, more in particular at least 125 $m^2/g$. The support material may have a surface area of at most 1200 $m^2/g$, preferably at most 300 $m^2/g$, more preferably at most 200 $m^2/g$, most preferably at most 175 $m^2/g$.

The size and shape of the support material is not critical to the invention and may be in the form of chunks, pieces, cylinders, rings, spheres, wagon wheels, tablets, trilobes, and the like of a size suitable for employment in a fixed bed, for example from 2 mm to 30 mm.

The absorbent may have a quantity of silver relative to the surface area of the support material (i.e., silver density) of less than 0.025 g $Ag/m^2$, preferably at most 0.01 g $Ag/m^2$, more preferably at most 0.005 g $Ag/m^2$. The absorbent may have a silver density of at least $1\times10^{-5}$ g $Ag/m^2$, preferably at least $5\times10^{-5}$ g $Ag/m^2$, more preferably at least $1\times10^{-4}$ g $Ag/m^2$. It is preferred that the absorbent has a lower silver density than the transition metal density (i.e., gold, silver, platinum, palladium and the like) of the catalyst.

The absorbent for use in this invention comprises an alkali or alkaline earth metal. Preferably, the alkali metal may be selected from sodium, potassium, lithium, rubidium, cesium, and combinations thereof, in particular sodium. Preferably, the alkaline earth metal may be selected from calcium, magnesium, strontium, barium, and combinations thereof. The alkali metal may suitably be provided in salt or base form. Suitable alkali metal salts may include, but are not limited to, nitrates, oxalates, citrates, acetates, carbonates, and the like. Preferably, the alkali metal may be in the form of a hydroxide, carbonate or bicarbonate. The alkaline earth metal may suitably be provided in salt or base form. Suitable alkaline earth metal salts may include, but are not limited to, nitrates, oxalates, citrates, acetates, carbonates, and the like. Preferably, the alkaline earth metal may be in the form of a hydroxide. Without wishing to be bound by theory, it is believed that the alkali or alkaline earth metals reduce the amount of acidic sites present on the surface of the support material which can react with a hydrocarbon such as an olefin, forming unwanted by-products in the feed. The alkali or alkaline earth metals may be present in a total quantity of at least 0.1 mmole/kg, more typically at least 1 mmole/kg, in particular at least 10 mmole/kg, more in particular at least 50 mmole/kg, most in particular at least 100 mmole/kg, calculated as the total quantity of the element relative to the weight of the absorbent. The alkali or alkaline earth metals may be present in a quantity of at most 5000 mmole/kg, preferably at most 500 mmole/kg, more preferably at most 300 mmole/kg, calculated as the total quantity of the element relative to the weight of the absorbent.

The sulfur impurities may include, but are not limited to, dihydrogen sulfide, carbonyl sulfide, mercaptans, organic sulfides, and combinations thereof. The mercaptans may include methanethiol or ethanethiol. The organic sulfides may include aromatic sulfides or alkyl sulfides, such as dimethylsulfide. Mercaptans and organic sulfides, in particular organic sulfides, are particularly difficult sulfur impurities to remove from a feed. In the treated feed components, the quantity of sulfur impurities may be at most 50% w of the total quantity of sulfur impurities present in the untreated feed components, preferably at most 25% w, more preferably at most 1% w, on the same basis.

The halogen impurities may include freons, halohydrocarbons, and combinations thereof. The freons may include, but are not limited to, $CF_2Cl_2$, $CF_3Cl$, and $CF_3Br$. The halohydrocarbons may include, but are not limited to, tetrachloroethylene. In the feed components treated at high temperature, the quantity of halogen impurities may be at most 50% w of the total quantity of halogen impurities present in the untreated feed components, preferably at most 40% w, more preferably at most 10% w, on the same basis.

The reaction feed containing the treated one or more feed components is then contacted with the catalyst under process conditions to yield a reaction product. The catalyst may comprise a metal selected from Group IB, Group VIB, Group VIIB, Group VIIIB, and combinations thereof, of the Periodic Table of Elements (as described as the CAS version in the Periodic Table of Elements in the "CRC Handbook of Chemistry and Physics", $69^{th}$ ed. (CRC Press Inc. 1988)).

In particular embodiments the process is a process for preparing an olefin oxide by reacting a feed comprising an olefin and oxygen in the presence of a catalyst which comprises silver. By way of an example, a detailed description is given hereinafter of embodiments of this invention which involve a process for the epoxidation of an olefin.

The following description provides details of a silver catalyst, its preparation and its use in an epoxidation process. The following description is not intended to be limiting on the scope of the invention.

The catalyst typically used for the epoxidation of an olefin is a catalyst comprising silver deposited on a carrier. The size and shape of the catalyst is not critical to the invention and may be in the form of chunks, pieces, cylinders, rings, spheres, wagon wheels, tablets, and the like of a size suitable for employment in a fixed bed shell-and-tube heat exchanger reactor vessel, for example from 2 mm to 20 mm.

The carrier may be based on a wide range of materials. Such materials may be natural or artificial inorganic materials and they may include refractory materials, silicon carbide, clays, zeolites, charcoal, and alkaline earth metal carbonates, for example calcium carbonate. Preferred are refractory materials, such as alumina, magnesia, zirconia, silica, and mixtures thereof. The most preferred material is α-alumina. Typically, the carrier comprises at least 85% w, more typically at least 90% w, in particular at least 95% w α-alumina, frequently up to 99.9% w α-alumina, relative to the weight of the carrier. Other components of the α-alumina carrier may comprise, for example, silica, titania, zirconia, alkali metal components, for example sodium and/or potassium components, and/or alkaline earth metal components, for example calcium and/or magnesium components.

The surface area of the carrier may suitably be at least 0.1 $m^2/g$, preferably at least 0.3 $m^2/g$, more preferably at least 0.5 $m^2/g$, and in particular at least 0.6 $m^2/g$, relative to the weight of the carrier; and the surface area may suitably be at most 10 $m^2/g$, preferably at most 6 $m^2/g$, and in particular at most 4 $m^2/g$, relative to the weight of the carrier. "Surface area" as used herein is understood to relate to the surface area as determined by the B.E.T. (Brunauer, Emmett and Teller) method as described in Journal of the American Chemical Society 60 (1938) pp. 309-316. High surface area carriers, in particular when they are alpha alumina carriers optionally comprising in addition silica, alkali metal and/or alkaline earth metal components, provide improved performance and stability of operation.

The water absorption of the carrier may suitably be at least 0.2 g/g, preferably at least 0.25 g/g, more preferably at least 0.3 g/g, most preferably at least 0.35 g/g; and the water absorption may suitably be at most 0.85 g/g, preferably at most 0.7 g/g, more preferably at most 0.65 g/g, most preferably at most 0.6 g/g. The water absorption of the carrier may be in the range of from 0.2 to 0.85 g/g, preferably in the range of from 0.25 to 0.7 g/g, more preferably from 0.3 to 0.65 g/g, most preferably from 0.3 to 0.6 g/g. A higher water absorption may be in favor in view of a more efficient deposition of the metal and promoters, if any, on the carrier by impregnation. However, at a higher water absorption, the carrier, or the catalyst made therefrom, may have lower crush strength. As used herein, water absorption is deemed to have been measured in accordance with ASTM C20, and water absorption is expressed as the weight of the water that can be absorbed into the pores of the carrier, relative to the weight of the carrier.

The preparation of the catalyst comprising silver is known in the art and the known methods are applicable to the preparation of the shaped catalyst particles which may be used in the practice of this invention. Methods of depositing silver on the carrier include impregnating the carrier with a silver compound containing cationic silver and/or complexed silver and performing a reduction to form metallic silver particles. For further description of such methods, reference may be made to U.S. Pat. No. 5,380,697, U.S. Pat. No. 5,739,075, EP-A-266015, and U.S. Pat. No. 6,368,998, which methods are incorporated herein by reference. Suitably, silver dispersions, for example silver sols, may be used to deposit silver on the carrier.

The reduction of cationic silver to metallic silver may be accomplished during a step in which the catalyst is dried, so that the reduction as such does not require a separate process step. This may be the case if the silver containing impregnation solution comprises a reducing agent, for example, an oxalate, a lactate or formaldehyde.

Appreciable catalytic activity may be obtained by employing a silver content of the catalyst of at least 10 g/kg, relative to the weight of the catalyst. Preferably, the catalyst comprises silver in a quantity of from 50 to 500 g/kg, more preferably from 100 to 400 g/kg, for example 105 g/kg, or 120 g/kg, or 190 g/kg, or 250 g/kg, or 350 g/kg, on the same basis. As used herein, unless otherwise specified, the weight of the catalyst is deemed to be the total weight of the catalyst including the weight of the carrier and catalytic components.

The catalyst may have a quantity of silver relative to the surface area of the support material (i.e., silver density) of at least 0.025 g $Ag/m^2$, preferably at least 0.05 g $Ag/m^2$, more preferably at least 0.1 g $Ag/m^2$. The catalyst may have a quantity of silver relative to the surface area of the support material of at most 1.5 g $Ag/m^2$, preferably at most 1 g $Ag/m^2$, more preferably at most 0.5 g $Ag/m^2$. The catalyst may have a quantity of silver relative to the surface area of the support material in the range of from 0.01 to 1 g $Ag/m^2$. It is preferred that the catalyst has a higher silver density than the absorbent.

The catalyst for use in this invention may comprise a promoter component which comprises an element selected from rhenium, tungsten, molybdenum, chromium, nitrate- or nitrite-forming compounds, and combinations thereof. Preferably the promoter component comprises, as an element, rhenium. The form in which the promoter component may be deposited onto the carrier is not material to the invention. Rhenium, molybdenum, tungsten, chromium or the nitrate- or nitrite-forming compound may suitably be provided as an oxyanion, for example, as a perrhenate, molybdate, tungstate, or nitrate, in salt or acid form.

The promoter component may typically be present in a quantity of at least 0.1 mmole/kg, more typically at least 0.5 mmole/kg, in particular at least 1 mmole/kg, more in particular at least 1.5 mmole/kg, calculated as the total quantity of the element (that is rhenium, tungsten, molybdenum and/or chromium) relative to the weight of the catalyst. The promoter component may be present in a quantity of at most 50 mmole/kg, preferably at most 10 mmole/kg, calculated as the total quantity of the element relative to the weight of the catalyst.

When the catalyst comprises rhenium as the promoter component, the catalyst may preferably comprise a rhenium co-promoter, as a further component deposited on the carrier. Suitably, the rhenium co-promoter may be selected from components comprising an element selected from tungsten, chromium, molybdenum, sulfur, phosphorus, boron, and combinations thereof. Preferably, the rhenium co-promoter is selected from tungsten, chromium, molybdenum, sulfur, and combinations thereof. It is particularly preferred that the rhenium co-promoter comprises, as an element, tungsten and/or sulfur.

The rhenium co-promoter may typically be present in a total quantity of at least 0.1 mmole/kg, more typically at least 0.25 mmole/kg, and preferably at least 0.5 mmole/kg, calculated as the element (i.e. the total of tungsten, chromium, molybdenum, sulfur, phosphorus and/or boron), relative to the weight of the catalyst. The rhenium co-promoter may be present in a total quantity of at most 40 mmole/kg, preferably at most 10 mmole/kg, more preferably at most 5 mmole/kg, on the same basis. The form in which the rhenium co-promoter may be deposited on the carrier is not material to the invention. For example, it may suitably be provided as an oxide or as an oxyanion, for example, as a sulfate, borate or molybdate, in salt or acid form.

The catalyst preferably comprises silver, the promoter component, and a component comprising a further element, deposited on the carrier. Eligible further elements may be selected from the group of nitrogen, fluorine, alkali metals, alkaline earth metals, titanium, hafnium, zirconium, vanadium, thallium, thorium, tantalum, niobium, gallium and germanium and combinations thereof. Preferably the alkali metals are selected from lithium, potassium, rubidium and cesium. Most preferably the alkali metal is lithium, potassium and/or cesium. Preferably the alkaline earth metals are selected from calcium, magnesium and barium. Typically, the further element is present in the catalyst in a total quantity of from 0.01 to 500 mmole/kg, more typically from 0.05 to 100 mmole/kg, calculated as the element on the weight of the catalyst. The further elements may be provided in any form. For example, salts of an alkali metal or an alkaline earth metal are suitable. For example, lithium compounds may be lithium hydroxide or lithium nitrate.

Preferred amounts of the components of the catalysts are, when calculated as the element, relative to the weight of the catalyst:
  silver from 10 to 500 g/kg,
  rhenium from 0.01 to 50 mmole/kg, if present,
  the further element or elements, if present, each from 0.1 to 500 mmole/kg, and,
  the rhenium co-promoter from 0.1 to 30 mmole/kg, if present.

As used herein, the quantity of alkali metal present in the catalyst/absorbent is deemed to be the quantity insofar as it can be extracted from the catalyst/absorbent with de-ionized water at 100° C. The extraction method involves extracting a 10-gram sample of the catalyst/absorbent three times by heating it in 20 ml portions of de-ionized water for 5 minutes at 100° C. and determining in the combined extracts the relevant metals by using a known method, for example atomic absorption spectroscopy.

As used herein, the quantity of alkaline earth metal present in the catalyst/absorbent is deemed to be the quantity insofar as it can be extracted from the catalyst/absorbent with 10% w nitric acid in de-ionized water at 100° C. The extraction method involves extracting a 10-gram sample of the catalyst/absorbent by boiling it with a 100 ml portion of 10% w nitric acid for 30 minutes (1 atm., i.e. 101.3 kPa) and determining in the combined extracts the relevant metals by using a known method, for example atomic absorption spectroscopy. Reference is made to U.S. Pat. No. 5,801,259, which is incorporated herein by reference.

Although the present epoxidation process may be carried out in many ways, it is preferred to carry it out as a gas phase process, i.e. a process in which one or more components of the feed are first contacted in the gas phase with the packed bed of absorbent to yield treated feed components, as described hereinbefore, and subsequently the gaseous feed comprising the treated feed components is contacted with the packed bed of catalyst. Generally the process is carried out as a continuous process.

In addition to the olefin and oxygen, the feed components may further comprise a saturated hydrocarbon dilution gas, a reaction modifier, an inert dilution gas, and a recycle gas stream. Preferably, the olefin is contacted with the absorbent in a purification zone prior to contact with the catalyst in the reaction zone. One or more of the additional feed components may also be contacted with the absorbent in a purification zone either in conjunction with or separate from the olefin.

The olefin for use in the present epoxidation process may be any olefin as discussed hereinbefore. The most preferred olefin is ethylene.

The quantity of olefin present in the reaction feed may be selected within a wide range. Typically, the quantity of olefin present in the reaction feed may be at most 80 mole-%, relative to the total reaction feed. Preferably, it may be in the range of from 0.5 to 70 mole-%, in particular from 1 to 60 mole-%, more in particular from 5 to 40 mole-%, on the same basis.

Preferably, the saturated hydrocarbons, if any, may be contacted with the absorbent in a purification zone prior to contact with the catalyst in the reaction zone. The saturated hydrocarbon may be treated in conjunction with the olefin or separately. Saturated hydrocarbons, in particular methane, ethane and mixtures thereof, more in particular methane, may be present in a quantity of at most 80 mole-%, relative to the total reaction feed, in particular at most 75 mole-%, more in particular at most 65 mole-%, on the same basis. The saturated hydrocarbons may be present in a quantity of at least 30 mole-%, preferably at least 40 mole-%, on the same basis. Saturated hydrocarbons may be added to the reaction feed in order to increase the oxygen flammability limit.

The present epoxidation process may be air-based or oxygen-based, see "Kirk-Othmer Encyclopedia of Chemical Technology", $3^{rd}$ edition, Volume 9, 1980, pp. 445-447. In the air-based process, air or air enriched with oxygen is employed as the source of the oxidizing agent while in the oxygen-based processes high-purity (at least 95 mole-%) oxygen or very high purity (at least 99.5 mole-%) oxygen is employed as the source of the oxidizing agent. Reference may be made to U.S. Pat. No. 6,040,467, incorporated by reference, for further description of oxygen-based processes. Presently most epoxidation plants are oxygen-based and this is a preferred embodiment of the present invention.

The quantity of oxygen present in the reaction feed may be selected within a wide range. However, in practice, oxygen is generally applied in a quantity which avoids the flammable regime. Typically, the quantity of oxygen applied may be within the range of from 2 to 15 mole-%, more typically from 5 to 12 mole-%, relative to the total reaction feed.

In order to remain outside the flammable regime, the quantity of oxygen in the reaction feed may be lowered as the quantity of the olefin is increased. The actual safe operating ranges depend, along with the feed composition, also on the reaction conditions such as the reaction temperature and the pressure.

A reaction modifier may be present in the reaction feed for increasing the selectively, suppressing the undesirable oxidation of olefin or olefin oxide to carbon dioxide and water, relative to the desired formation of olefin oxide. Many organic compounds, especially organic halides and organic nitrogen compounds, may be employed as the reaction modifiers. Nitrogen oxides, organic nitro compounds such as nitromethane, nitroethane, and nitropropane, hydrazine, hydroxylamine or ammonia may be employed as well. It is frequently considered that under the operating conditions of olefin epoxidation the nitrogen containing reaction modifiers are precursors of nitrates or nitrites, i.e. they are so-called nitrate- or nitrite-forming compounds (cf. e.g. EP-A-3642 and U.S. Pat. No. 4,822,900, which are incorporated herein by reference).

Organic halides are the preferred reaction modifiers, in particular organic bromides, and more in particular organic chlorides. Preferred organic halides are chlorohydrocarbons or bromohydrocarbons. More preferably they are selected from the group of methyl chloride, ethyl chloride, ethylene dichloride, ethylene dibromide, vinyl chloride or a mixture thereof. Most preferred reaction modifiers are ethyl chloride and ethylene dichloride.

Suitable nitrogen oxides are of the general formula $NO_x$ wherein x is in the range of from 1 to 2.5, and include for example $NO$, $N_2O_3$, $N_2O_4$, and $N_2O_5$. Suitable organic nitrogen compounds are nitro compounds, nitroso compounds, amines, nitrates and nitrites, for example nitromethane, 1-nitropropane or 2-nitropropane. In preferred embodiments, nitrate- or nitrite-forming compounds, e.g. nitrogen oxides and/or organic nitrogen compounds, are used together with an organic halide, in particular an organic chloride.

The reaction modifiers are generally effective when used in small quantities in the reaction feed, for example at most 0.1 mole-%, relative to the total reaction feed, for example from $0.01 \times 10^{-4}$ to 0.01 mole-%. In particular when the olefin is ethylene, it is preferred that the reaction modifier is present in the reaction feed in a quantity of from $0.1 \times 10^{-4}$ to $500 \times 10^{-4}$ mole-%, in particular from $0.2 \times 10^{-4}$ to $200 \times 10^{-4}$ mole-%, relative to the total reaction feed.

Inert dilution gases, for example nitrogen, helium or argon, may be present in the reaction feed in a quantity of from 30 to 90 mole-%, typically from 40 to 80 mole-%, relative to the total reaction feed.

A recycle gas stream may be used as a reaction feed component in the epoxidation process. The reaction product comprises the olefin oxide, unreacted olefin, unreacted oxygen, reaction modifier, dilution gases, and, optionally, other reaction by-products such as carbon dioxide and water. The reaction product is passed through one or more separation systems, such as an olefin oxide absorber and a carbon dioxide absorber, so the unreacted olefin and oxygen may be recycled to the reactor system. Carbon dioxide is a by-product in the epoxidation process. However, carbon dioxide generally has an adverse effect on the catalyst activity. Typically, a quantity of carbon dioxide in the reaction feed in excess of 25 mole-%, in particular in excess of 10 mole-%, relative to the total reaction feed, is avoided. A quantity of carbon dioxide of less than 3 mole-%, preferably less than 2 mole-%, more preferably less than 1 mole-%, relative to the total reaction feed, may be employed. Under commercial operations, a quantity of carbon dioxide of at least 0.1 mole-%, in particular at least 0.2 mole-%, relative to the total reaction feed, may be present in the feed.

The epoxidation process may be carried out using reaction temperatures selected from a wide range. Preferably the reaction temperature is in the range of from 150 to 325° C., more preferably in the range of from 180 to 300° C.

The epoxidation process is preferably carried out at a reactor inlet pressure in the range of from 1000 to 3500 kPa. "GHSV" or Gas Hourly Space Velocity is the unit volume of gas at normal temperature and pressure (0° C., 1 atm, i.e. 101.3 kPa) passing over one unit volume of packed catalyst per hour. Preferably, when the epoxidation process is a gas phase process involving a packed catalyst bed, the GHSV is in the range of from 1500 to 10000 Nl/(l·h). Preferably, the process is carried out at a work rate in the range of from 0.5 to 10 kmole olefin oxide produced per $m^3$ of catalyst per hour, in particular 0.7 to 8 kmole olefin oxide produced per $m^3$ of catalyst per hour, for example 5 kmole olefin oxide produced per $m^3$ of catalyst per hour. As used herein, the work rate is the amount of the olefin oxide produced per unit volume of catalyst per hour and the selectivity is the molar quantity of the olefin oxide formed relative to the molar quantity of the olefin converted. As used herein, the activity is a measurement of the temperature required to achieve a particular ethylene oxide production level. The lower the temperature, the better the activity.

The olefin oxide produced may be recovered from the reaction product by using methods known in the art, for example by absorbing the olefin oxide from a reactor outlet stream (i.e., reaction product) in water and optionally recovering the olefin oxide from the aqueous solution by distillation. At least a portion of the aqueous solution containing the olefin oxide may be applied in a subsequent process for converting the olefin oxide into a 1,2-diol, a 1,2-diol ether, a 1,2-carbonate, or an alkanolamine.

The olefin oxide produced in the epoxidation process may be converted into a 1,2-diol, a 1,2-diol ether, a 1,2-carbonate, or an alkanolamine. As this invention leads to a more attractive process for the production of the olefin oxide, it concurrently leads to a more attractive process which comprises producing the olefin oxide in accordance with the invention and the subsequent use of the obtained olefin oxide in the manufacture of the 1,2-diol, 1,2-diol ether, 1,2-carbonate, and/or alkanolamine.

The conversion into the 1,2-diol or the 1,2-diol ether may comprise, for example, reacting the olefin oxide with water, suitably using an acidic or a basic catalyst. For example, for making predominantly the 1,2-diol and less 1,2-diol ether, the olefin oxide may be reacted with a ten fold molar excess of water, in a liquid phase reaction in presence of an acid catalyst, e.g. 0.5-1.0% w sulfuric acid, based on the total reaction mixture, at 50-70° C. at 1 bar absolute, or in a gas phase reaction at 130-240° C. and 20-40 bar absolute, preferably in the absence of a catalyst. The presence of such a large quantity of water may favor the selective formation of 1,2-diol and may function as a sink for the reaction exotherm, helping control the reaction temperature. If the proportion of water is lowered, the proportion of 1,2-diol ethers in the reaction mixture is increased. The 1,2-diol ethers thus produced may be a di-ether, tri-ether, tetra-ether or a subsequent ether. Alternative 1,2-diol ethers may be prepared by converting the olefin oxide with an alcohol, in particular a primary alcohol, such as methanol or ethanol, by replacing at least a portion of the water by the alcohol.

The olefin oxide may be converted into the corresponding 1,2-carbonate by reacting it with carbon dioxide. If desired, a 1,2-diol may be prepared by subsequently reacting the 1,2-carbonate with water or an alcohol to form the 1,2-diol. For applicable methods, reference is made to U.S. Pat. No. 6,080,897, which is incorporated herein by reference.

The conversion into the alkanolamine may comprise, for example, reacting the olefin oxide with ammonia. Anhydrous ammonia is typically used to favor the production of monoalkanolamine. For methods applicable in the conversion of the olefin oxide into the alkanolamine, reference may be made to, for example U.S. Pat. No. 4,845,296, which is incorporated herein by reference.

The 1,2-diol and the 1,2-diol ether may be used in a large variety of industrial applications, for example in the fields of food, beverages, tobacco, cosmetics, thermoplastic polymers, curable resin systems, detergents, heat transfer systems, etc. The 1,2-carbonates may be used as a diluent, in particular as a solvent. The alkanolamine may be used, for example, in the treating ("sweetening") of natural gas.

Unless specified otherwise, the low-molecular weight organic compounds mentioned herein, for example the olefins, 1,2-diols, 1,2-diol ethers, 1,2-carbonates, alkanolamines, and reaction modifiers, have typically at most 40 carbon atoms, more typically at most 20 carbon atoms, in particular at most 10 carbon atoms, more in particular at most 6 carbon atoms. As defined herein, ranges for numbers of carbon atoms (i.e. carbon number) include the numbers specified for the limits of the ranges.

Having generally described the invention, a further understanding may be obtained by reference to the following examples, which are provided for purposes of illustration only and are not intended to be limiting unless otherwise specified.

EXAMPLES

Example 1

Preparation of Stock Silver Solution

This example describes the preparation of a stock silver impregnation solution used in preparing Absorbent A in the Examples.

A silver-amine-oxalate stock solution was prepared by the following procedure:

In a 5-liter stainless steel beaker, 415 g of reagent-grade sodium hydroxide were dissolved in 2340 ml de-ionized water, and the temperature was adjusted to 50° C.

In a 4-liter stainless steel beaker, 1699 g high purity "Spectropure" silver nitrate was dissolved in 2100 ml de-ionized water, and the temperature was adjusted to 50° C.

The sodium hydroxide solution was added slowly to the silver nitrate solution, with stirring, while maintaining a solution temperature of 50° C. This mixture was stirred for 15 minutes. The pH of the solution was maintained at above 10 by the addition of sodium hydroxide solution as required.

Water was removed from the precipitate created in the mixing step and the conductivity of the water, which contained sodium and nitrate ions, was measured. An amount of fresh de-ionized water equal to the amount removed was added back to the silver solution. The solution was stirred for 15 minutes at 40° C. The process was repeated until the conductivity of the water removed was less than 90 µmho/cm. 1500 ml fresh deionized water was then added. 630 g of high-purity oxalic acid dihydrate were added in approximately 100 g increments. The temperature was kept at 40° C. (±5° C.) and the pH of the solution was monitored during the addition of the last 130 grams of oxalic acid dihydrate to ensure that the pH did not drop below 7.8 for an extended period of time. Water was removed from this mixture to leave a highly concentrated silver-containing slurry. The silver oxalate slurry was cooled to 30° C.

699 g of 92 weight percent ethylenediamine (8% de-ionized water) was added while maintaining a temperature no greater than 30° C. The final solution was used as a stock silver impregnation solution for preparing Absorbent A.

Example 2

Preparation of the Absorbent

Absorbent A:

Absorbent A was prepared by the following procedure: To 100 grams of stock silver solution of specific gravity 1.548 g/ml was added 1.0 g of sodium hydroxide dissolved in 20 g of water. A vessel containing 40 grams of Support A (see Table I below for a description of the gamma alumina trilobes) was evacuated to 20 mm Hg for 1 minute and the final impregnation solution was added to Support A while under vacuum, then the vacuum was released and the carrier allowed to contact the liquid for 3 minutes. The impregnated Support A was then centrifuged at 500 rpm for 2 minutes to remove excess liquid. Impregnated Support A was placed in a vibrating shaker and dried in air flowing at a rate of 16.2 Nl/h at 250° C. for 15 minutes producing Absorbent A.

The final composition of Absorbent A comprised 24.1% Ag as measured by digestion in nitric acid and silver titration and 260 mmole Na/kg absorbent, calculated on the basis of pore volume impregnation. These values are relative to the weight of the absorbent.

TABLE I

| Support A Properties | |
|---|---|
| Surface Area (m$^2$/g) | 140 |
| Water pore volume (cc/g) | 0.97 |
| Compacted Bulk Density (kg/m$^3$) | 490 |

Example 3

Testing of the Absorbent 4 g of the crushed absorbent was loaded into a stainless steel U-shaped tube. The ends of the tube were connected to a gas flow system. The inlet gas pressure was 1550 kPa (absolute). The temperature of the absorbent was at ambient temperature (25° C.).

The gas mixture passed through the absorbent bed, in a "once-through" operation, during the entire five days of the test run and consisted of 10 ppmv dihydrogen sulfide ($H_2S$), 10 ppmv carbonyl sulfide (COS), 10 ppmv ethanethiol ($C_2H_5SH$), 10 ppmv dimethylsulfide ($CH_3)_2S$, and the balance nitrogen. The flow rate of the gas mixture was 3.0 Nl/l·h. These levels of sulfur-containing impurities are much higher than experienced in commercial operations.

Six fractions of the absorbent bed were analyzed for total sulfur content by XRF (x-ray fluorescence) analysis. The results of the XRF analysis were as follows (from the inlet most fraction to the outlet most fraction): 0.85% w; 0.68% w; 0.25% w; 0.05% w; 0.042% w, relative to the weight of the spent absorbent. A sample of fresh Absorbent A analyzed on the same instrument was 0.053% w S. The results demonstrate that the absorbent according to the invention is effective at reducing the amount of sulfur-containing impurities in a feed component.

What is claimed is:

1. A process for reacting a feed comprising a hydrocarbon, which process comprises:
    contacting the feed with an absorbent comprising silver, an alkali or alkaline earth metal, and a support material having a surface area of more than 20 $m^2/g$ positioned within a purification zone of a reactor system to reduce the quantity of one or more impurities in the feed; and
    subsequently contacting the feed with a catalyst positioned downstream from the purification zone to yield a reaction product.

2. The process as claimed in claim 1, wherein the hydrocarbon is an olefin; wherein the reaction product comprises an olefin oxide; and wherein the feed further comprises oxygen.

3. The process as claimed in claim 2, wherein the hydrocarbon further comprises a saturated hydrocarbon selected from the group consisting of methane, ethane, propane, butane, pentane, hexane, heptane, octane, nonane, decane, undecane, dodecane, and mixtures thereof; and wherein the feed further comprises a reaction modifier and a recycle gas stream.

4. The process as claimed in claim 2, wherein the catalyst has a greater silver density than the absorbent; wherein the purification zone comprises a first purification zone and a second purification zone; and wherein the process further comprises:
    contacting the olefin with the absorbent positioned inside the first purification zone at a temperature in the range of from 0 to 350° C.; and
    separately contacting the oxygen with the absorbent positioned inside the second purification zone at a temperature in the range of from 190 to 350° C.

5. The process as claimed in claim 2, wherein the process further comprises converting the olefin oxide to a 1,2-diol, a 1,2-diol ether, a 1,2-carbonate, or an alkanolamine.

6. The process as claimed in claim 2, wherein the oxygen is present in a quantity of at least 0.5 mole-%, relative to the total feed.

7. The process as claimed in claim 1, wherein the purification zone and the catalyst are positioned inside a shell-and-tube heat exchanger reactor vessel.

8. The process as claimed in claim 7, wherein the temperature of the absorbent in the purification zone is at least 90° C.

9. The process as claimed in claim 1, wherein the feed is contacted with the catalyst in a reaction zone positioned downstream from the purification zone, and wherein the temperature in the reaction zone is at least 130° C.

10. The process as claimed in claim 1, wherein the absorbent is in the form of a packed bed.

11. The process as claimed in claim 1, wherein the catalyst comprises a carrier and silver in a quantity of at least 0.025 g $Ag/m^2$ relative to the surface area of the carrier; and wherein the absorbent comprises silver in a quantity of less than 0.025 g $Ag/m^2$ relative to the surface area of the support material.

12. The process as claimed in claim 1, wherein the catalyst comprises silver and one or more selectivity enhancing dopants selected from the group consisting of rhenium, molybdenum, tungsten, chromium, nitrate-forming compounds, nitrite-forming compounds, and combinations thereof.

13. The process as claimed in claim 1, wherein the support material has a surface area of at least 25 $m^2/g$.

14. The process as claimed in claim 1, wherein the support material has a surface area of 50 to 1200 $m^2/g$.

15. The process as claimed in claim 1, wherein the feed further comprises at least one impurity selected from the group consisting of a sulfur impurity and a halogen impurity.

16. A process for reacting a feed comprising an olefin, oxygen and an impurity, which process comprises:
    contacting the feed with an absorbent comprising silver, an alkali or alkaline earth metal, and a support material having a surface area of more than 20 $m^2/g$ positioned within a purification zone of a reactor system to reduce the quantity of the impurity in the feed; and
    subsequently contacting the feed with an epoxidation catalyst positioned downstream from the purification zone to yield an olefin oxide.

17. The process as claimed in claim 16, wherein the feed comprises at least one impurity selected from the group consisting of a sulfur impurity and a halogen impurity.

18. The process as claimed in claim 16, wherein the process further comprises converting the olefin oxide to a 1,2-diol, a 1,2-diol ether, a 1,2-carbonate, or an alkanolamine.

19. The process as claimed in claim 16, wherein the olefin is ethylene.

20. The process as claimed in claim 16, wherein the support material has a surface area of 50 to 1200 $m^2/g$.

* * * * *